May 18, 1965 G. G. MURPHY 3,184,540
CONTROLLED FACSIMILE COPY CUTTING MECHANISM
Filed May 31, 1962
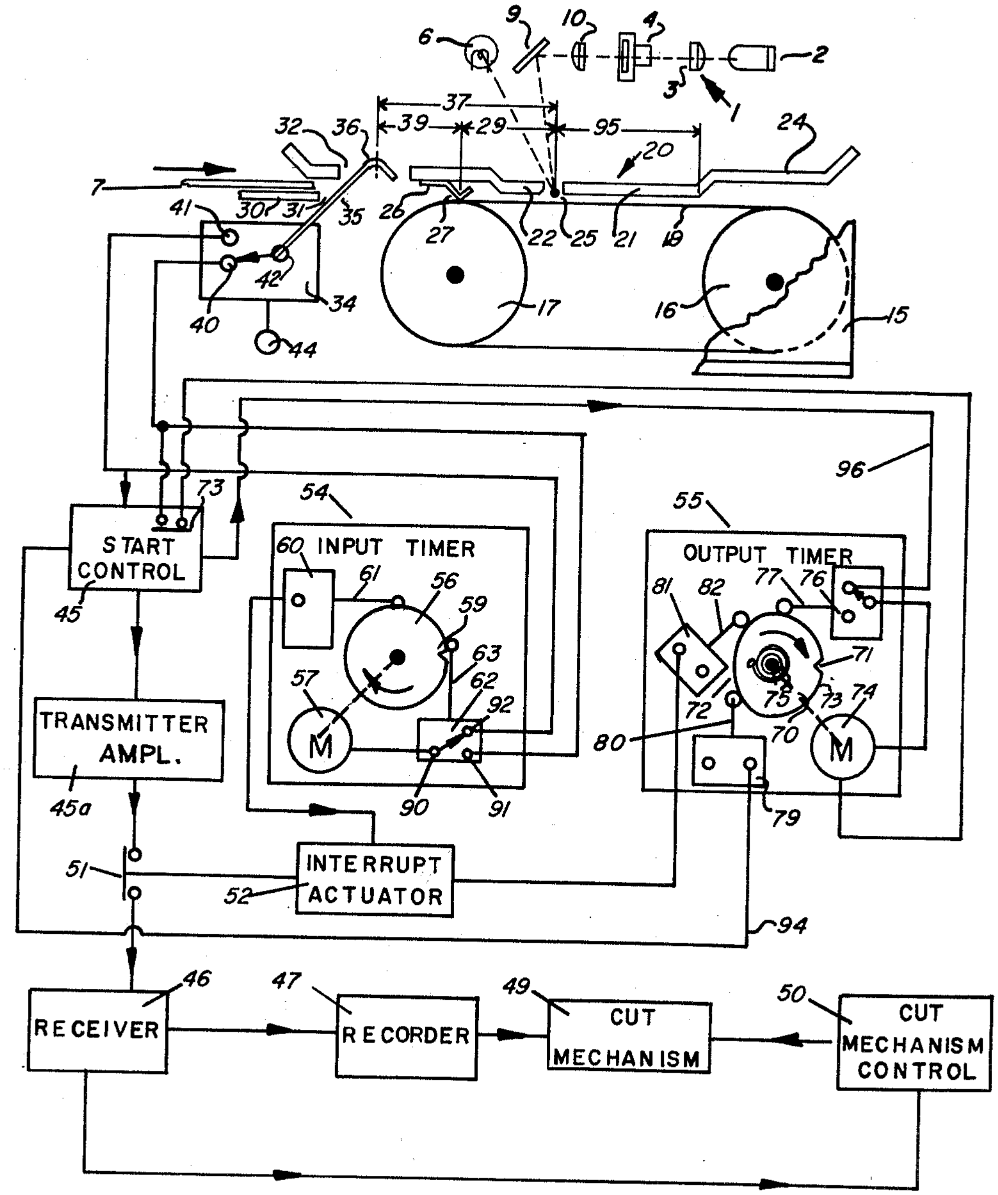
INVENTOR.
GERALD G. MURPHY
BY Edward V. Conners
Attorney 3,184,540
Patented May 18, 1965

3,184,540

CONTROLLED FACSIMILE COPY CUTTING MECHANISM

Gerald G. Murphy, Clifton, N.J., assignor to Hogan Faximile Corporation, New York, N.Y.

Filed May 31, 1962, Ser. No. 199,112
6 Claims. (Cl. 178—6)

The present invention relates to a facsimile system, and more particularly to a controlled facsimile system including a cut off mechanism for recorded copy.

Electrical facsimile communication is the art in which graphic material such as pictures, drawings, printed or typed material, or the like, is scanned and the information converted into electric facsimile signals which are used either locally or remotely to produce a "facsimile" of the original or "subject copy."

In a typical facsimile transmitter subject copy is continuously moved past a scanning area where it is illuminated and its reflected image is focussed on an image dissecting device or so-called "scanner" by a lens system. The image dissecting device includes a fixed plate having a linear light transmitting slit and an adjacent rotatable disc having a spiral light transmitting slit positioned in the light path to photoelectric means. By the movement of the spiral slit past the linear slit an optical window is swept across the image of the copy as the copy is moved over the scanned area. The output of the photoelectric means is a series of trains of analogue type electric video signals. In order to provide for the transmission of phasing or other signals, a so-called "backstroke interval" is provided between each train of electric video signals.

In a typical facsimile receiver, recorder means are provided in which an electrolytic recording medium from a supply roll is continuously moved between a fixed linear electrode and a helical electrode which is usually carried on the surface of a rotatable drum. The recording is made by passage of the electric video signals through the recording medium. "Phasing" is the term used for the adjustment of the start of recording position along the scanning line. Proper phasing is accomplished when the received video signal for each line of scan is recorded starting at the left hand margin of the recording medium. Suitable phasing mechanism is provided so that the copy is properly phased responsive to the transmitted phasing pulses.

Under operating conditions certain problems are presented. For example, the subject copy fed to the transmitter may be of varying lengths with varying intervals between each sheet of subject copy, and the transmitter may be intermittently operated. It is desirable that the recorded facsimile be delivered from the recorder in sheets of the same length as the transmitted copy. However, because the recording medium is supplied from a roll, during the interval between the feeding of each sheet of subject copy, and during the interval between transmissions while the recorder is being phased with the transmitter, there is continuous operation of the recorder, and thus there is a leader strip ahead of the first facsimile, and scrap or waste strips between each successive recorded facsimile.

An object of the present invention is to provide a controlled facsimile system which is simple and economical in manufacture, efficient in operation and durable in use.

Other objects and advantages of the invention will be apparent from the following description and the accompanying drawing which shows, by way of example, an embodiment of the invention.

In the drawing there is a schematic showing of a controlled facsimile system in accordance with the invention.

Referring to the drawing there is shown a facsimile transmitter 1 including a photocell 2 adapted to receive light collected by a lens 3 from an image dissector 4 which is adapted to make a line by line elemental scan. Light from a source 6 is reflected from a sheet of subject copy 7 to a mirror 9 and collected by a lens system 10 for transmission to the image dissector 4. The facsimile transmitter is well known in the art and includes circuitry for interposing a phasing pulse between successive lines of video scan.

The facsimile transmitter 1 includes copy feed means having a supporting frame 15 providing journalling means for supporting rollers 16 and 17. A feed belt 19 is carried by the rollers. Positioned over the feed belt 19 is a scanning plate 20 extending generally parallel to the surface of the belt between the rollers. The scanning plate 20 has a central portion 21, a leading end portion 22 and a trailing end portion 24. The central portion 21 is in contact with the belt 19. The leading end portion 22 and the trailing end portion 24 are spaced from the belt. A transversely extending scanning slot 25 is positioned in the center portion 21 of the plate 20. Suitable copyfeed means is further described and claimed in my copending application titled Facsimile Transmitter Copy Feed and filed on even date herewith.

On the underside of the scanning plate 20 is a downwardly depending spring member 26 having a gripping edge 27. The gripping edge 27 is spaced a predetermined distance 29 from the scanning slot 25. In axial alignment with the belt 19 is a pedestal forming a feeding surface 30, the feeding surface providing means for the introduction of subject copy between the belt 19 and the scanning plate 20. An opening 31 is provided in the pedestal 30 and a corresponding opening 32 is provided in the leading edge 22 of the scanning plate 20.

Positioned beneath the feeding surface 30 is a double poled timer switch 34 having an operating arm 35 extending upwardly through the openings 31 and 32 and preferably formed with a turned over tip 36. In its rest position the tip 36 of the operating arm 35 is positioned a predetermined distance 37 from the scanning slot 25. Likewise the tip 36 is positioned a predetermined distance 39 from the gripping edge 27. The operating arm 35 is adapted to be moved downwardly by contact with subject copy 7 as it is passed between the underside of the scanning plate 20 and the upper surface of the belt 19. In its upper position the operating arm 35 makes contact with pole 40 of the timer switch 34 and in downward position makes contact with pole 41 thereof. Midpole 42 of the timer switch 34 is connected to a source of power applied at terminal 44.

Terminal 41 is connected to a start control 45 of the transmitter. During normal operation of the transmitter and at its rest position a suitable motor for rotation of the rollers 16 and 17 is in operation. However, the transmitter is not producing a carrier signal as the initiation of the carrier signal is adapted to set transmitter amplifier 45*a* and receiver 46 into operation. The receiver 46 after being energized from its standby by the carrier signal operates an enabling circuit to set the recorder in operation.

The insertion of the copy 7 into the copy feed causes the operating arm 35 to be moved downwardly and at the same instant the leading edge of the copy is gripped between the gripping edge 27 and belt 19. Inasmuch as the belt 19 is moved a predetermined rate of speed there will be a definite elapsed time as represented by the distance 29 before the leading edge of the copy reaches the scanning slot 25. During this period the recorder has been activated and the leading edge of the recording medium, which in the case of electrolytic recording medium may have become dried out, is started in movement, so that a fresh portion of the recording medium is moved towards the recording position.

The receiver 46 operates a recorder 47 of the type utilizing electrolytic recording medium. A cut mechanism 49 controlled by a cut mechanism control 50 is adapted to be actuated by signals from the transmitter 45 to separate the waste leading edge of the recorded copy and to separate the recorded copy at the end of the recording.

The actuation of the cut mechanism control 50 is controlled by a transmission interruptor switch 51 actuated by an interrupt actuator 52. The operation of the interrupt actuator 52 is controlled by an input timer 54 and an output timer 55. The input timer 54 includes a timing disc 56 rotated by a timing motor 57, the disc having a notch 59 on its periphery. Adjacent the timing disc 56 is an interruptor actuator switch 60 controlled by an operating arm 61. Also operated by the timing disc 56 is a single pole double throw reset switch 62.

The output timer 55 includes a spring reset timing disc 70 notched as indicated at 71 and having a flattened edge 72 of its periphery 73. The disc 70 is driven by a motor 74 and reset upon deenergization of the motor by a spring 75 utilizing mechanism well known in the art. The supply for the motor 74 is provided through relay contacts 73 operative by the start control 45. A single throw double pole reset switch 76 is controlled by an operating arm 77. A single throw cut off switch 79 is controlled by an operating arm 80. A single pole interruptor switch 81 has an operating arm 82.

The input timer 54 has two sequentially operating timing periods. The first of the input timer operating periods corresponds to the time 29 for the subject copy 7 to be carried by the belt 19 from the gripping edge 27 to the scanning slot 25. At the end of the first of the input timer operating periods, the operating arm 61 drops into the notch 59 thereby actuating the switch 60 and causing the interrupt actuator 52 to make a momentary opening of the transmission interruptor switch 51. The timing disc 56 continues its rotation until the operating arm 63 drops into the notch 59 thereby causing an actuation of the reset switch 62. The reset switch 62 has a single pole terminal 90 connected to the motor 57 and double throw contacts 91 and 92. When the operating arm 63 is in the notch 59 the contact 90 is connected to the terminal 91. However, as illustrated in the drawing, in the reset position, when the operating arm 63 has just left the notch 59, the terminal 90 is connected to contact 92. Contact 92 is supplied from contact 41 of the switch 34 and thus is the normal supply for the starting of the input timer 54. Power for the operation of the motor 57 for the timing disc 56 when the contact 90 is applied to the terminal 91 is supplied from terminal 40 of the switch 34.

In the operation so far described, the copy 7 has been inserted between the belt 19 and the scanning plate and has moved the distance 29 so that its leading edge is about to be scanned at the slot 25 and the interruptor switch 51 has actuated, thereby sending a signal to the receiver 46 for the operation of the cut mechanism control 50 and the input timer 54 has received the end of the operating arm 63 in its notch 59 thereby stopping rotation of the timing disc 56. This condition of the timer mechanism is maintained until the trailing edge of the copy 7 has passed the operating tip 36 of the operating arm 35. As the operating arm 35 is released, contact is made with the terminal 40, which applies a potential to the switch 62 which at that moment has its terminal 90 connected to terminal 91. This starts rotation of the disc 56 until the arm 63 is just raised out of the notch 59 which causes the terminal 90 to swing over to the terminal 92 thereby discontinuing further rotation of the timer disc 56 and is the second of the two sequentially operating periods of the input timer 54. The input timer 54 is thus readied for an operation to be caused by the insertion of another sheet of copy in the copy feed.

Meanwhile, upon the closing of the contacts 42 and 40 the timing motor 74 for the output timer 55 is actuated causing the timing disc 70 to rotate in the clockwise direction. The first operation upon the rotation of the disc 70 is for the operating arm 82 to be lifted from the flattened portion 72 to the periphery 73 of the disc 70 thereby causing the switch 81 to be actuated into the closed position so as to effect actuation of the interrupt actuator 52 which thus causes a momentary opening of the transmission interrupting switch 51. A pulse is thereby provided for the receiver to actuate the cut mechanism to separate the trailing edge of the copy 7.

The operation just described is the end of the first of two sequentially operated timing periods of the output timer 55 and is the period corresponding to the time required for the subject copy 7 to be carried by the belt 19 from its release of the tip 36 to the scanning slot 25. This timing period is indicated by the distance 37.

In the event no following copy has been inserted into the transmitter, and the operating arm 35 remains in the upward position thereby maintaining potential to the motor 74 of the output timer 55, the disc 70 continues its rotation until the tip of arm 80 of switch 79 drops into the notch 71 causing an actuation of the switch 79. The switch 79, through lead 94, effects release of the start control 45 and thereby deenergizes the transmitter ceasing the transmission of the carrier signal and deenergizing the motor 74 which allows the timing disc 70 to return to its original start position under the action of its return spring 75. After the carrier signal has been absent for a predetermined time the receiver becomes deenergized and thus both units are restored to their standby positions.

The second of the output timer 55 sequential operating periods corresponds to the time for the subject copy to pass from the slot 25 to the start of the trailing end 24 where it is released from the gripping action of the belt 19 and is discharged from the transmitter, and is represented by the distance 95.

Unless other means were provided, in the event a second or following sheet of copy were to be fed into the transmitter causing the operating arm 35 to move downward, the output timer 55 would have been deenergized without the cut signal being transmitted. In order to cause the cut signal to be given, hold means are provided in the output timer 55 including the switch 76 which receives a source of power from the start control 45 through the hold line 96 to continue operation of the motor 74 and the rotation of the timing disc 70 until slightly after the cut operation has taken place. The operating arm 77 is then moved into position to disconnect the supply to the motor 74 through the hold line 96 allowing the timer 55 to reset.

While the invention has been described and illustrated with reference to a specific embodiment thereof it will be understood that other embodiments may be resorted to without departing from the invention. Therefore, the form of the invention set out above should be considered as illustrative and not as limiting the scope of the following claims.

I claim:

1. A controlled facsimile system comprising a transmitter including means for producing electric facsimile signals representative of subject copy, a recorder responsive to the facsimile signals, a recorder cut mechanism to separate recorder facsimile copy, a control mechanism for the cut mechanism adapted to be controlled by an interruption of the facsimile signal, a frame, rollers journalled in the frame, a feed belt carried by the rollers, a scanning plate extending generally parallel to the surface of the belt between the rollers, the plate including a central portion and leading and trailing end portions, the central portion in contact with the belt, the leading and trailing end portions spaced from the belt, means forming a scanning slot in the central portion of the plate and extending transversely with respect to the direction of travel of the belt, a spring member extending downwardly from the leading portion of the scanning plate, a gripping edge for the end of the spring member in releasable contact with the belt, the gripping edge spaced a predetermined distance from the scanning slot, means forming a feeding surface positioned in alignment with the surface of the belt adjacent the scanning plate and providing means for the introduction of subject copy between the belt and the scanning plate, means forming an opening in the feeding surface, a double poled timer control switch, an operating arm for the timer control switch extending through the opening in the feeding surface and positioned a predetermined distance ahead of the gripping edge, the operating arm adapted to be moved downwardly by contact with subject copy, the operating member in its upward position adapted to make contact with one of the poles of the timer control switch, and in downward position adapted to make contact with the other of the poles of the timer control switch, a control for the transmitter connected to said other of the poles of the timer control switch and operative upon the downward movement of the operating arm for the starting of the transmitter and the transmission of a carrier signal, a transmission interruptor switch in the output of the transmitter, a motor driven input timer connected to said other of the holes of the timer control switch and operative upon the downward movement of the operating arm, the input timer having two sequentially operating timing periods, the first of the input timer operating periods corresponding to the time required for the subject copy to be carried by the belt from the gripping edge to the scanning slot, means in the input timer to effect a timed actuation of the transmission interruptor switch at the end of the input timer first operating period, stop means in the input timer operative for the stopping thereof after actuation of the transmission interrupter switch, reset means for the input timer, a motor driven output timer connected to said one of the poles of the timer control switch and operative upon the upward movement of the operating arm, the output timer having two sequentially operated timing periods, the first of the output timer operating periods corresponding to the time required for the subject copy to be carried by the belt from the point of release of the operating arm to the scanning slot, means in the output timer to effect timed actuation of the transmission interrupter switch at the end of the output timer first timing period, means in the output timer to effect actuation of the control for the transmitter for the stopping thereof at the end of the output timer second timing period, the reset means in the input timer actuated upon the upward movement of the operating arm and thereby initiating the second of the input timer periods corresponding to a period of time sufficient to ready the input timer for another sequence of operations whereby the carrier signal is interrupted at predetermined intervals dependent upon the receipt of subject copy by the transmitter, the interruption of the carrier signal controlling the cut mechanism of the recorder.

2. A controlled facsimile system comprising a transmitter including means for producing electric facsimile signals representative of subject copy, a recorder responsive to the facsimile signals, a recorder cut mechanism to separate recorded facsimile copy, a control mechanism for the cut mechanism adapted to be controlled by an interruption of the facsimile signal, a frame, rollers journalled in the frame, a feed belt carried by the rollers, a scanning plate extending generally parallel to the surface of the belt between the rollers, the plate including a central portion and leading and trailing end portions, the central portion in contact with the belt, the leading and trailing end portions spaced from the belt, means forming a scanning slot in the central portion of the plate and extending transversely with respect to the direction of travel of the belt, a spring member extending downwardly from the leading portion of the scanning plate, a gripping edge for the end of the spring member in releasable contact with the belt, the gripping edge spaced a predetermined distance from the scanning slot, means forming a feeding surface positioned in alignment with the surface of the belt adjacent the scanning plate and providing means for the introduction of subject copy between the belt and the scanning plate, means forming an opening in the feeding surface, a double poled timer control switch, an operating arm for the timer control switch extending through the opening in the feeding surface and positioned a predetermined distance ahead of the gripping edge, the operating arm adapted to be moved downwardly by contact with subject copy, the operating member in its upward position adapted to make contact with one of the poles of the timer control switch, and in downward position adapted to make contact with the other of the poles of the timer control switch, a control for the transmitter connected to said other of the poles of the timer control switch and operative upon the downward movement of the operating arm for the starting of the transmitter and the transmission of a carrier signal, a transmission interrupter switch in the output of the transmitter, a motor driven input timer connected to said other of the poles of the timer control switch and operative upon the downward movement of the operating arm, the input timer having two sequentially operating timing periods, the first of the input timer operating periods corresponding to the time required for the subject copy to be carried by the belt from the gripping edge to the scanning slot, means in the input timer to effect a timed actuation of the transmission interrupter switch at the end of the input timer first operating period, stop means in the input timer operative for the stopping thereof after actuation of the transmission interrupter switch, reset means including a double throw single pole switch for the input timer motor tripped at the end of the input timer first operating period, a motor driven output timer connected to said one of the poles of the timer control switch and operative upon the upward movement of the operating arm, the output timer having two sequentially operated timing periods, the first of the output timer operating periods corresponding to the time required for the subject copy to be carried by the belt from the point of release of the operating arm to the scanning slot, means in the output timer to effect timed actuation of the transmission interrupter switch at the end of the output timer first timing period, means in the output timer to effect actuation of the control for the transmitter for the stopping thereof at the end of the output timer second timing period, the reset means double throw switch in the input timer actuated upon the upward movement of the operating arm and thereby initiating the second of the input timer periods corresponding to a period of time sufficient to ready the input timer for another sequence of operations whereby the carrier signal is interrupted at predetermined intervals dependent upon the receipt of subject copy by the transmitter, the interruption of the carrier signal controlling the cut mechanism of the recorder.

3. A controlled facsimile system comprising a transmitter including copy inlet means, copy feed means to accept subject copy introduced into said copy inlet means, transmitter scanning means to convert graphic information on the copy to an electric video signal and including a scanning area, trasmitter means for producing an electric actuating signal, a receiver for the video and actuating signals, the receiver including recorder means to convert the video signal to graphic information on a strip of recording medium having a waste leading edge, a recorder cut mechanism to cut the strip, recorder control mechanism adapted to actuate the recorder cut mechanism responsive to an actuating signal from the transmitter received by said receiver, and transmitter control mechanism interposed in the path of copy entering said copy feed means and positioned between said copy inlet means and said scanning area and responsive to the introduction of said copy for operating said means for producing an actuating signal, whereby the waste leading edge is cut from the recorded copy.

4. A controlled facsimile system comprising a transmitter including copy inlet means, copy feed means to accept subject copy introduced into said copy inlet means, transmitter scanning means to convert graphic information on the copy to an electric video signal and including a scanning area, transmitter means for producing an electric actuating signal, delay means for producing an actuating signal when the delay period is terminated, a receiver for the video and actuating signals, the receiver including recorder means to convert the video signal to graphic information on a strip of recording medium, a recorder cut mechanism to cut the strip, recorder control mechanism adapted to actuate the recorder cut mechanism responsive to an actuating signal from the transmitter received by said receiver, and transmitter control mechanism interposed in the path of copy entering said copy feed means and positioned between said copy inlet means and said scanning area and responsive to the passage of the trailing edge of said copy for terminating the delay period whereby an actuating signal is produced so that the recorded copy is cut from said strip of recording medium.

5. A controlled facsimile system comprising a transmitter including copy inlet means, copy feed means to accept subject copy introduced into said copy inlet means, transmitter scanning means to convert graphic information on the copy to an electric video signal and including a scanning area, transmitter means for producing an electric actuating signal, delay means for producing an actuating signal when the delay period is terminated, a receiver for the video and actuating signals, the receiver including recorder means to convert the video signal to graphic information on a strip of recording medium, a recorder cut mechanism to cut the strip, recorder control mechanism adapted to actuate the recorder cut mechanism responsive to an actuating signal from the transmitter received by said receiver, transmitter control mechanism including operating means interposed in the path of copy entering said copy feed means and position between said copy inlet means and said scanning area, said control mechanism responsive to movement of the operating means by contact with the leading edge of subject copy introduced into said copy inlet means for operating said means for producing an actuating signal so that the waste leading edge is cut from the recorded copy and for setting said delay means into operation, said control means responsive to the release of said operating means by the passage of the trailing edge of the subject copy for terminating the delay period producing an actuating signal so that the recorded copy is cut from said strip of recording medium.

6. A controlled facsimile system comprising a transmitter including copy inlet means, copy feed means to accept subject copy introduced into said copy inlet means, transmitter scanning means to convert graphic information on the copy to an electric video signal and including a scanning area, the scanning area spaced from transmitter means for producing an electric actuating signal, delay means for producing an actuating signal when the delay period is terminated, a receiver for the video and actuating signals, the receiver including recorder means to convert the video signal to graphic information on a strip of recording medium, a recorder cut mechanism to cut the strip, recorder control mechanism adapted to actuate the recorder cut mechanism responsive to an actuating signal from the transmitter received by said receiver, transmitter control mechanism including operating means interposed in the path of copy entering said copy feed means and positioned between said copy inlet means and said scanning area and spaced from the scanning area the length of the space defining a hold period while the subject copy is being transported from said operating means to said scanning area by said copy feed, hold means for the control mechanism operative for said hold period, said control mechanism responsive at the end of the hold period of the hold means to movement of the operating means by contact with the leading edge of subject copy introduced into said copy inlet means for operating said means for producing an actuating signal so that the waste leading edge is cut from the recorded copy at the start of recording and for setting said delay means into operation, said control means responsive to the release of said operating means by the passage of the trailing edge of the subject copy for terminating the delay period producing an actuating signal so that the recorded copy is cut from said strip of recording medium at the end of recording.

References Cited by the Examiner

UNITED STATES PATENTS

| | | | |
|---|---|---|---|
| 2,570,313 | 10/51 | Bourgonjon | 346—24 |
| 2,739,029 | 3/56 | Pollard | 346—24 |

DAVID G. REDINBAUGH, *Primary Examiner.*